| United States Patent [19] | [11] | 4,092,406 |
|---|---|---|
| Job | [45] | May 30, 1978 |

[54] FERRO LIME

[75] Inventor: Allen R. Job, Pincourt, Canada

[73] Assignee: Domtar Inc., Montreal, Canada

[21] Appl. No.: 716,238

[22] Filed: Aug. 20, 1976

[51] Int. Cl.$^2$ .................. C01G 49/00; C01B 13/14; C21C 7/00; C22B 9/00

[52] U.S. Cl. .................................. 423/594; 423/636; 75/3; 75/55; 75/93 F

[58] Field of Search ............... 423/635, 636, 637, 593, 423/594; 75/54, 55, 93 A, 93 F, 94, 3, 5

[56] References Cited

U.S. PATENT DOCUMENTS

| 2,159,977 | 5/1939 | Nicholas | 75/93 F |
|---|---|---|---|
| 2,806,776 | 9/1957 | Veale et al. | 75/5 |
| 2,931,717 | 4/1960 | Lee | 75/3 |
| 3,163,519 | 12/1964 | Hanson et al. | 75/94 |
| 3,311,465 | 3/1967 | Ban et al. | 75/55 |
| 3,645,719 | 2/1972 | Minnick | 75/94 |
| 3,938,987 | 2/1976 | Ban | 75/3 |

*Primary Examiner*—Earl C. Thomas
*Assistant Examiner*—Gary P. Straub
*Attorney, Agent, or Firm*—C. A. Rowley

[57] ABSTRACT

A method of making ferro-lime in a rotary lime kiln by feeding pellets containing iron into the kiln together with the stone to be processed. The pellets should be substantially dust free and strong enough to withstand the tumbling action of the kiln without disintegrating, and should be of a size and density compatible with the stone being fed to ensure proper mixing within the kiln. This invention is particularly adapted to the formation of ferro-lime or dolomitic ferro-lime.

2 Claims, No Drawings

FERRO LIME

The present invention relates to a process for the manufacture of ferro-lime, more specifically, the present invention relates to a process for producing ferro-lime in a rotary lime kiln by feeding to the kiln, with the stone, pellets containing iron.

In the smelting of iron and steel it is customary to use either limestone or lime as a fluxing agent for the removal of such impurities as silicon, phosphorous and sulphur. Both lime and limestone have certain disadvantages. Limestone must be calcined in the furnace which not only requires time but also robs the furnace of heat. Lime, on the other hand, slakes rapidly in the atmosphere producing a dust problem and also is a relatively bulky material which increases the handling expense and charging time to the furnace.

It has been proposed to use ferro-lime as a fluxing agent in place of the limestone or lime. Ferro-lime obviously does not have to be calcined in the furnace, does not slake as rapidly as regular lime and has higher density than lime. Also the iron content of the ferro-lime adds to the production from the furnace.

It has also been proposed to make ferro-lime in a rotary lime kiln as the lime is being formed. For example, U.S. Pat. No. 2,159,977 issued May 30, 1939 to Nicholas teaches various ways in which Ferro Lime may be produced in a rotary kiln. Some of the methods mentioned are by spraying of iron oxide into the kiln with the fuel or in a separate air blast, but the preferred means disclosed is by feeding the treating or impregnating agent (iron oxide) with the limestone rock as it is fed to the kiln. However, to applicant's knowledge there are no commercially satisfactory processes of producing ferro-lime in a rotary lime kiln.

It is thus an object of the present invention to provide a method of producing ferro-lime in a rotary lime kiln.

Broadly, the present invention relates to a method of producing ferro-lime in a rotary lime kiln by feeding pellets contain iron together with the calcinable stone into the kiln, mixing the pellets and limestone as they pass through the kiln, heating the calcinable stone to calcine same, and reacting the iron in the pellets with lime as it is formed from the calcinable stone.

Surprisingly it has been found that as the lime is formed in the kiln, it reacts with the iron from the pellets to form ferro-lime and the size of each of the pellets gradually diminishes as the iron content is extracted therefrom by reaction with the lime.

The iron containing pellets may be commercial iron ore pellets of suitable size and density compatible with the size of the rock being calcined. The closer the size and density of the pellets to the size and density of the rock the better the mixing within the kiln. However, it has been found that the sizes need not be identical, but nevertheless, the size of the pellets should be between about ⅛ to 1½ inch, preferably ¼ to ⅜. The stone size may be in the range of about ⅛ to 2½ inch, preferably ⅝ to 1 inch.

The iron containing pellets should be substantially dust free and must be strong enough to withstand the tumbling action in the kiln without significant disintegration.

It is preferred to use commercial iron ore pellets to provide the source of iron for feeding to the kiln. The chemical composition of the pellets should be free of any substantial amounts of impurities that would effect the operation of the kiln or the fluxing operation of the furnace. Particular care must be excercised with respect to the silica content of the pellets since the three phase system formed by iron, lime and silica has a eutectic temperature well below the iron/lime eutectic temperature and thus excess silica will result in too much liquid being present in the kiln and the formation of large agglomerates.

It has been found that about 12% by weight of silica based on the iron in the pellet is tolerable. Significantly higher silica contents result in problems and extreme care should be taken to ensure silica content is not too high when selecting the pellets.

Care must be taken not to include too much silica in the particles, however, the presence of some silica is advantageous as it lowers the melting point and facilitates the reaction of the iron with the lime and penetration of the iron in the lime to form a more uniform ferro-lime product.

Care must also be taken to insure that the silica content of the calcinable rock does not result in similar problems. However it is not as easy to predict the effect of the silica in the rock as it is not distributed as uniformly as that in the pellets nor is it as readily available to the iron. Thus while the silica content of the rock is important it may not be as detrimental as the silica in the pellets due to its size and distribution in the rock.

While iron ore pellets, particularly magnetite pellets, form a good source of iron it will be apparent that other pellet material, for example, hematite ore pellets or even mill scale pellets or the like may be used provided they have the required physical characteristics of strength, size and density to permit feeding through the kiln without significant disintegration and will mix properly.

Further features, objects and advantages will be evident from the following detailed examples of the present invention.

EXAMPLE 1

Substantially dust free hard commercial hematite pellets having diameter in the range of ⅜ to ⅝ of an inch were fed together with Beachville limestone of ¼ to ½ inch size into a 9 ft inside diameter by 275 ft. long rotary lime kiln. The average flow of pellets was 1,100 pounds per hour while the stone feed was at the rate of 40,000 pounds per hour. The pellets contained on the average 92.9 $Fe_2O_3$ and 6.0% $SiO_2$. The test was conducted over a 5 day period.

The resulting ferro-lime contained 62% of the iron from the pellets and the Ferro Lime contained about 2.15% iron.

A substantial portion of the remainder of the iron from the pellets was contained in the fines (−10 mesh) that were screened from the ferro-lime product after formation. These ferro-lime fines if desired may be reclaimed by conventional methods such as briquetting or the like.

The temperature in the kiln had to be raised about 225° C above the temperature normally used for calcining the limestone, i.e. the maximum temperature in the kiln was raised to about 1300° C to 1375° C.

Example 2

In a similar test using iron oxide in the form of mill scale of 40% minus 20 mesh size, only 50% of the iron is found in the ferro-lime product. Approximately 5% of the mill scale was carried off in the gas stream and was lost to the scrubber discharge, but by far the largest part of the iron loss was caused by mill scale fines reacting with lime fines to form a plastic reaction mass which formed into ferro-lime balls (approximately 20% Fe.) as large as 1 foot in diameter. The remainder of the lost mill scale adhered to the kiln refractories forming a large ring which had to be shot out daily with a commercial shot gun and resulted in a substantial loss of production during the shooting. The temperature in the kiln had to be raised about 225° C above the temperature normally used for calcining the limestone, i.e. the temperature in the kiln was raised to about 1300° C to 1375° C.

The resultant product was degraded in two ways.

1. The ferro-lime balls were trapped behind the discharge dam in the kiln and ground the ferro-lime product producing a dusty kiln atmosphere which interfered with the heat transfer from the flame and increased the fuel consumption. A large quantity of the iron was lost in the ferro-lime fines that were produced by the ball milling action. These fines could be reclaimed as above described by conventional techniques of briquetting, etc. The quantity of fines produced was about 100% higher than that produced by the method of example 1.

2. Shooting the ring caused a considerable amount of over sized material in the product thereby creating a separating problem to remove the over size. Also, the cost of shooting these rings is quite substantial.

Example 3

Joliette Limestone, of ¼ to ¾ inch size together with iron pellets ⅜ to ⅝ inches (50% to 60% passing through half-inch screen) were fed to the rotary kiln used in Example 1, modified by the addition of 18-inch dams at both the 46 ft. and 165th ft. marks from the discharge end of the kiln.

The limestone had approximately the following analysis in percent by weight:

Loss on ignition: 42.6
$SiO_2$ and in solubles: 2.2
$Al_2O_3$: 1.9
$Fe_2O_3$: 1.7
CaO: 53.7
MgO: 0.56
S: 0.08

The iron ore pellets had an average chemical analysis of 90.9% $Fe_2O_3$ and 6.16% $SiO_2$.

The pellets were fed to the kiln at a rate of approximately 1500 lbs. per hour and the stone at about 39,200 lbs. per hour. The test was conducted over a 5-day period. The temperature condition were essentially as outlined in Example 1.

The ferro-lime produced contained substantially all of the iron from the pellets and had a composition including 5.0% Fe (7.24% $Fe_2O_3$); 3.45% $SiO_2$ and insolubles and 0.007% sulphur.

Substantially all the iron was recovered with the ferro-lime product since the larger sized stone (compared with the stone used in Example 1) resulted in little if any non-usable fines being produced.

The sulphur content of the produced ferro-lime is considerably less, in fact an order of magnitude less than the sulphur content of the stone feed. This reduction of sulphur in the ferro-lime is an added advantage obtainable using the method of the present invention to form ferro-lime.

It will be apparent from comparison of Examples 1, 2 and 3 that there are vast differences in the results obtained using the process of Example 1 and 3, i.e. the present invention, versus the process of Example 2, i.e. the preferred method of U.S. Pat. No. 2,159,977. It is apparent that the process of Example 2 produced ferro-lime but it produced a far inferior product and required considerable excess of iron oxide.

In Example 1 about 62% iron was picked up in the Ferro Lime product and the product contained about 2.1% iron, however, it is preferred to operate to obtain a higher percentage of iron in the ferro-lime product. The optimum for steel processing at the current time being considered to be about 6% (i.e. approximately that obtained in Example 3). The present invention can easily be adapted to incorporate this amount of iron in the ferro-lime by increasing the ratio of pellets to stone in the feed.

Having described the invention, modification will be evident to those skilled in the art without departing from the spirit of the invention as defined in the appended claims. For example the disclosure has dealt solely with limestone but clearly the invention may be applied with dolomitic limestone or dolomite (the temperature within the kiln obviously will be higher for the formation of ferro-dolime).

I claim:

1. A method of producing ferro-lime in a rotary lime kiln having an inlet end, comprising feeding calcium carbonate containing stones selected from the group consisting of limestone, dolomitic limestone or dolomite stone, together with pellets formed predominately of mill scale into the inlet end of the kiln, said pellets containing no more than 12% silica by weight based on the iron content of said mill scale and being sufficiently strong to withstand the tumbling action within the kiln without significant disintegration, said stone having a size between ⅛ and 2½ inches and said pellets having a size between ⅛ and 1½ inches, selecting the size and density of said pellets in relation to the size and density of said stone to ensure proper mixing of said pellets and said stone during travel through the kiln, calcining said calcium carbonate in said stone to form lime and reacting said lime as it is formed with the iron in said mill scale thereby to form ferro-lime in said kiln.

2. A method as defined in claim 1 wherein said pellets are at between ¼ to ¾ inch and said stone is in the range of ⅜ to 1 inch.

* * * * *